CURRENCY TESTING SYSTEM

Original Filed March 14, 1961

INVENTOR.
JOHN E. STEINER

BY Shenier & O'Connor

ATTORNEYS

United States Patent Office

Re. 26,176
Reissued Mar. 21, 1967

26,176
CURRENCY TESTING SYSTEM

John E. Steiner, Rockford, Ill., assignor to Automatic Canteen Company of America, Chicago, Ill., a corporation of Delaware Original No. 3,114,445, dated Dec. 17, 1963, Ser. No. 95,725, Mar. 14, 1961. Application for reissue Nov. 23, 1965, Ser. No. 515,289
28 Claims. (Cl. 194—4)

Figure 1:
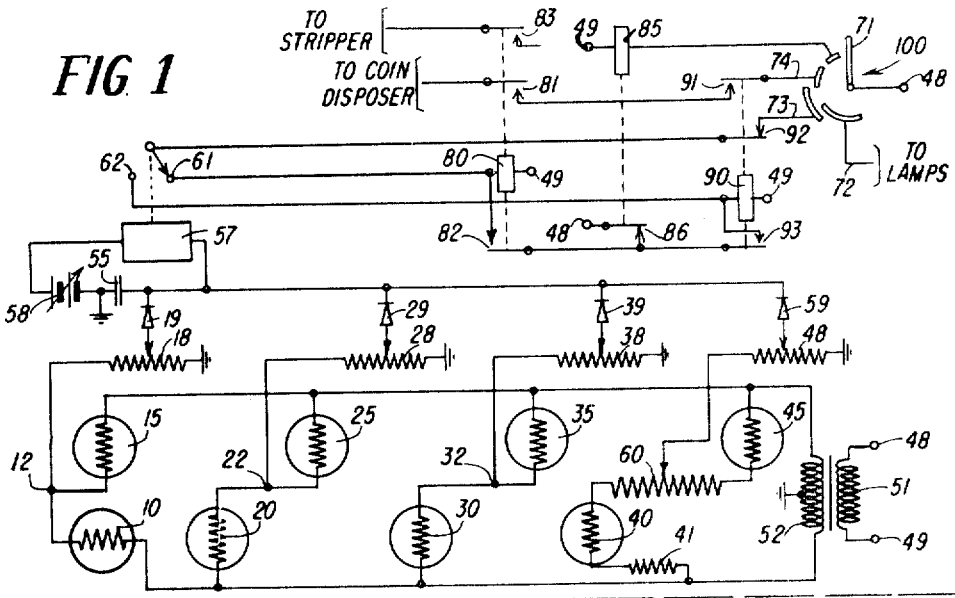

Matter enclosed in heavy brackets [ ] appears in the original patent but forms no part of this reissue specification; matter printed in italics indicates the additions made by reissue.

This invention relates in general to a material or currency testing arrangement and more particularly to an improved test arrangement therefor wherein a plurality of light responsive cells are arranged to provide a single output related to either minimum or maximum response of a material or currency note to a light condition and wherein the cells are arranged to automatically test different materials or currency note denominations.

In its organization, the present invention largely comprises novel structure for a currency acceptance unit and constitutes an improvement over the apparatus disclosed in application Ser. No. 744,966, filed on June 6, 1958, *now Patent No. 3,108,693*. That application and applications associated therewith disclose the mechanical structure and the basic circuit arrangements permitting certain currency evaluations to be made. The arrangement by which this is done comprises a horizontal slide having a trough therein into which currency such as a dollar bill is deposited. A door hingedly secured to the slide is closed over the deposited currency and the slide carrying the currency is reciprocated into a test position between certain lamps and light responsive cells. On the slide being operated into the test position, appropriate circuitry is controlled to operate a solenoid, which locks the slide in place. The lamps are then lighted. The light is transmitted in various degrees through respective areas of the currency, depending, of course, on the color and value of the respective areas. The light responsive cells underlying the various areas respond to the quantity of light passing through those areas to provide an indication of the acceptability of the currency. Thus these cells are divided into three groups called black, white, and green, in accordance with the well-known characteristics of currency notes. The currency is rejected if either the black or green cells receive more than a predetermined amount of light or the white cells less than a predetermined amount of light. If found unacceptable, the slide is released and coin payout prevented. If found acceptable, the currency is collected into a cash box on being stripped from the slide. This is done by a stripper motor, solenoid, and guillotine arrangement which operate as described in the mentioned application. Thereafter a tray clear test may be performed to verify that the note is stripped from the slide and collected as described in subsequent applications. A coin payout motor is now energized and it operates a cam or finger in any well-known manner to dispense the required coins. The slide is also released and automatically reciprocated into its unoperated position where it is prepared to receive another deposit of currency.

In the described arrangement, it was necessary to test in sequence for both minimum and maximum response of a currency note to the light condition. This required that apparatus be provided to initiate and control each sequence and that individual apparatus be provided for responding thereto. As may be appreciated, this considerably complicated the test apparatus.

In addition, meter or galvanometer type relays utilized in the described arrangement for measuring the response of the cells to the light conditions to which they were subjected have a number of well-known disadvantages. Among those disadvantages are the necessity to deflect a contact over a scale to close a set of contacts, necessitating either an insensitive device or a device having poor contact operation. Further, such devices have limitations in the number of contacts that can be operated thereby and their circuit arrangements must be altered in order to test for different limits of cell response.

Another limitation in the described arrangement related to the provision of circuit arrangements which would enable the testing of material of different characteristics such as currency notes of different denominations such as $1 and $5 notes.

In the present arrangement, the described and other limitations or disadvantages are eliminated. Thus, the present invention contemplates the arrangement of light responsive cells in a number of parallel legs connected across a single A.C. input. By balancing each leg to provide one output if a tested note is responding in a characteristic manner to the light, it is possible to detect variations therefrom by means of a single output circuit. If the variations exceed a predetermined value indicating an invalid note or simulated note that responds to light exposure by transmitting either too much or too little light to any cells, the variation from the normal or calibrated value is detected in one output circuit. This eliminates the need for separate circuit arrangements for detecting either minimum or maximum note response.

Further, by the use of a single output, the need for individual circuits to measure the response of separate cells is eliminated thereby providing substantial economies. Thus a single detecting device such as relay amplifier is provided for determining that output of the cells is either above or below normal. Such a device is characterized by binary action in which it is either on or off and is operated at a desired degree of sensitivity to positively maintain a set of contacts open or closed. It will be appreciated that a number of binary type devices may be substituted therefor to switch various circuits and that these need not necessarily include contacts sets as such. Also by using a cell which responds to light by change in resistance values to the passage of current, such as a metal sulphide cell, as represented by cadmium sulphide, it is possible to provide simple balanced circuit arrangements.

Another advantage is also derived from the invention in that the various parallel legs may be calibrated for several different normal conditions, thereby permitting currency notes of different denomination to be automatically tested by simply coordinating the output through different output detecting arrangements.

It is, therefore, an object of this invention to provide a simple, economical currency test arrangement and/or a material evaluation arrangement.

It is another object of this invention to provide a currency or material test apparatus which responds to the validity of a note without using meter relays.

It is still another object of this invention to provide a currency or material validity or evaluation test in which currency or material of different character or denomination is automatically tested.

It is another object of this invention to utilize light responsive apparatus in a currency or material evaluation test of the type whose resistance varies within great limits to the presence or absence of light.

It is another object of this invention to provide for a light response test of a particular material by arranging a plurality of light responsive cells in balanced circuits.

It is still another object of this invention to provide a more sensitive currency or material evaluation test having a desired minimum and maximum level of light response.

It is still another object of this invention to simultaneously test a material or currency for both a minimum and maximum level of light response.

With the foregoing and other objects in view which will appear as the description proceeds, the invention consists of certain novel features of construction, arrangement, and a combination of circuits and parts hereinafter more fully described, illustrated in the accompanying drawing, and particularly pointed out in the appended claims, it being understood that various changes in the form or arrangement and minor details of the structure or circuits may be made without departing from the spirit or sacrificing any of the advantages of the invention.

Figure 2:
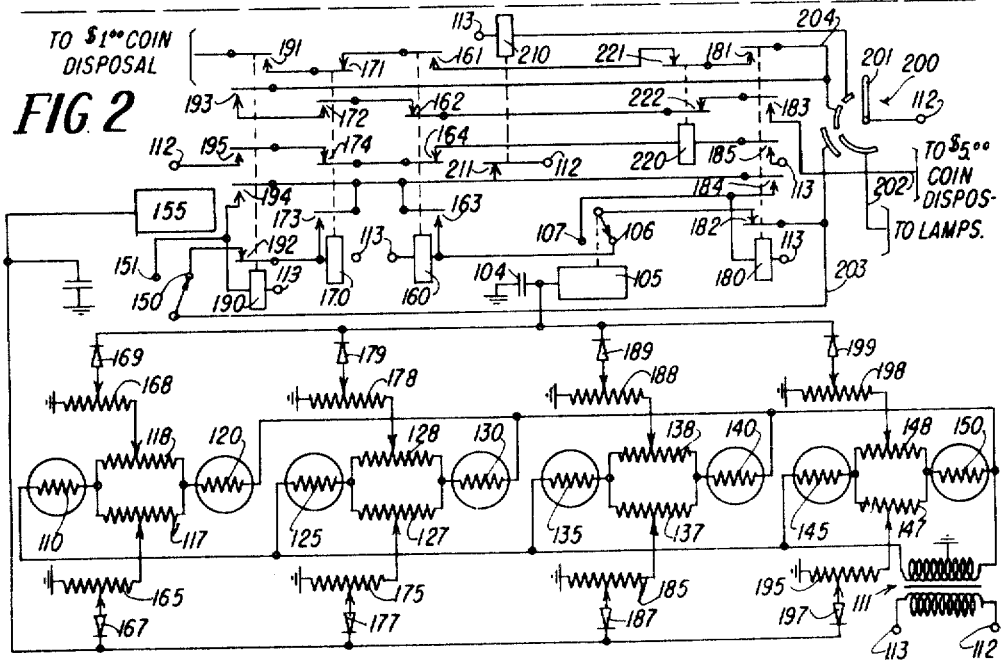

For the purpose of facilitating an understanding of this invention, there is illustrated in the accompanying drawings a preferred embodiment thereof, from an inspection of which, when considered in connection with the following description, this invention, its mode of construction, assembly and operation, and many of its advantages should be readily understood and appreciated:

FIG. 1 illustrates a circuit arrangement utilizing the principle of the present invention for testing a currency note of a single denomination; and FIG. 2 illustrates a circuit arrangement utilizing the principles of the present invention for automatically testing notes of several denominations.

Referring now to FIGS. 1 and 2, showing primarily the circuit arrangements for the light responsive cells whereby the novel tests are accomplished, it will be understood that such tests have general applicability although described herein in conjunction with currency test procedures and apparatus. Thus the light responsive cells 10, 20, 30, 40, and 45, shown in FIG. 1, and the light responsive cells 110, 120, 130, 140, 145, and 150, shown in FIG. 2, are arranged to respond to the presence or absence of light in a predetermined amount and are each related to respective areas of a currency note. Preferably these cells constitute well-known cadmium sulfide or lead sulfide cells whose resistance varies over a considerable range responsive to the degree of light present.

As described in the aforementioned application, a currency note or bill is deposited in a slide trough and when the note and slide are properly positioned in the test area, the slide is locked in position. Lamps (not shown) are then energized under control of a timer motor indicated at 100 in FIG. 1 and at 200 in FIG. 2, to transmit a predetermined degree of light to the note. The different areas of the note respond thereto in a characteristic manner by either transmitting or reflecting light frequencies from respective areas. Thus the cells 10 and 110, etc., may be positioned to respond to either the transmitted or reflected light.

In the aforementioned application, a number of test sequences were used in which a test was performed in order to determine the minimum and maximum light values transmitted respectively. Thereafter, a tray clear test could be performed as shown in subsequent applications to determine that the note had been properly collected, whereafter coin disposal occurred.

In the present arrangement, the need for successive tests is eliminated by arranging the light cells 10, 20 and 30 in series with an element such as variable resistors 15, 25 and 35 across a potential source such as transformer secondary 52 and testing across a potential source such as transformer and testing one point in the series circuit for a desired output potential as will be described more specifically hereinafter.

In the arrangement shown in FIG. 1, the light responsive cells 10, 20, and 30 are connected in parallel to each other and in series with respective variable or adjustable resistors 15, 25, and 35 in respective branches across the output of the secondary 52 of a transformer 50. To illustrate another concept of the invention, light responsive cells 40 and 45 are connected in parallel with the other branches and in series with each other across the secondary 52 of transformer 50. Resistors 15, 25, and 35 are each adjusted so that the current or voltage drop occurring thereacross is equal to that occurring through respective cells 10, 20, and 30 when light of the proper value and corresponding to a valid note is transmitted thereto. In the case of cells 40 and 45, they are positioned with respect to correspondingly colored areas of the note so that the current or voltage drops provided thereby are equal if the note is valid or alternatively the potentiometer 60 connecting cells 40 and 45 has its arm adjusted to provide a desired output at the arm when cells 40 and 45 are testing a valid note.

A fixed resistor 41 for example, may be inserted in series with cell 40 or alternatively used alone in place of cell 40. This resistor 41 can be utilized for improving the sensitivity of the apparatus by providing a fixed standard or reference potential. In such an arrangement the cells and arms need not be initially calibrated for a bill or note of average characteristics as a fixed value resistor provides a known standard.

The junctions 12, 22 and 32 between cells 10, 20, and 30 and their respective resistors 15, 25 and 35 are connected to ground through respective potentiometers 18, 28, and 38. The potentiometer 60 connected between cells 40 and 45 is adjusted so that the voltage level appearing at the arm preferably corresponds to that provided at junctions 12, 22 and 32 and the arm is also connected to ground through a potentiometer 48.

Each of the potentiometers 18, 28, 38 and 48 is adjusted so that any voltage developed between the respective junction 12, 22, etc. and ground is tapped at a desired value taking into account normal variations occurring at and between junctions 12, 22 and 32 and also the arm of potentiometer 60. Therefore equal potentials are provided from the arms of the potentiometers 18, 28, 38 and 48 to respective rectifiers 19, 29, 39 and 59.

The rectifiers 19, 29, 39 and 59 are connected in common to condenser 55 and resistor 55A and each is arranged to pass a positive potential to the condenser 55. Condenser 55 in turn feeds the relay amplifier indicated at 57. The amplifier 57 may be powered by the battery 58 whose voltage is adjusted as indicated, or any other suitable power source. The amplifier 57 may comprise any well known arrangement which is operated when the change on condenser 55 goes down to a predetermined value. These arrangements may include a relay or electronic device for operating a relay or various types of trigger or switching circuits utilizing vacuum tubes, thyratrons or transistors arranged if desired for operating a relay. It will also be understood, of course, that amplifiers may be interposed in any of the aforementioned circuits for ensuring output levels of desired value, with a negative potential being fed to the capacitor 55 if the amplifier needed a change in negative potential for its operation.

The relay amplifier or any other well known device serving the same function is characterized by a binary type action in which it is either operated or not. This condition is directly dependent on the charge accumulated by condenser 55, and the particular charge necessary to operate the amplifier 57 is, of course, dictated by its operating characteristics. The operation of the amplifier is indicated by the condition of its contacts 61 and 62. Thus if the relay or switch is unoperated, contacts 61 remain closed, but if operated, contacts 61 open and contacts 62 close.

These contacts 61 and 62 are fed by the rotor contact 71 of the timer motor 100. The timer motor 100 is similar to that described in the aforementioned application and modified in any well known manner to accomplish the purposes of the present invention. Therefore, only certain portions of the circuits prepared, controlled, or completed by the rotor contact 71 are illustrated, the remainder being well understood. Thus the circuits for initiating operation of the timer motor 100 are not illustrated, by circuits for controlling a stripper relay 80, reset relay 85, and bad impulse relay 90 are shown. The reset relay 85 functions to reset the apparatus after the test, as explained for a similar relay in the aforemenioned application, so that the slide may be reciprocated and another test cycle initiated. The bad impulse relay 90 is operated in the event the currency is simulated, invalid, or counterfeit, while the stripper relay 80 is operated to provide for the operation of the stripper motor and solenoid (not shown). The stripper motor and solenoid function to strip the note into a collect box whereafter coin payout is permitted. The stripping operation was explained in the aforementioned application and only change contemplated therein is the use of the stripper relay 80 for completing circuits thereto over contacts 83 instead of directly from the timer motor as in the aforementioned application. In addition, partial circuits for the lamps (not shown) and the coin dispensing arrangement are indicated at conductors 72 and 74 respectively. As the operation of the lamps and coin dispensing apparatus is described in the aforementioned application, only a portion of the circuits therefor are indicated to show the manner in which control is exercised thereover.

The secondary 52 of transformer 50 across which the light cells 10, 20, 30, 40, and 45 are connected is center tapped to ground, so that equal but opposite voltage levels appear at opposite ends of the transformer secondary. The primary 51 of transformer 50 is connected to respective terminals 48 and 49 of a 115 volt conventional A.C. source. With this voltage applied to the primary, each half of the secondary is wound to provide in the neighborhood of 10 volts. As the secondary 52 is of low impedance, changes in the impedance of the respective cells will not affect other cells materially.

It will also be noted that instead of connecting leads from the various circuit components to the 115 volt source that the respective connections thereto are indicated by the reference characters 48 and 49 applied whenever feasible to terminals adjacent the various components.

In FIG. 2, an arrangement is shown for automatically determining the validity of notes of different denominations utilizing the principle shown by the arrangement of cells 40 and 45 in series. Thus cells 110 and 120 are arranged in series in one leg, cells 125 and 130 in another leg, cells 135 and 140 in a third leg and cells 145 and 150 in a fourth leg, all of which legs are connected in parallel across the center-tapped secondary of the 115 volt transformer 111. The number of cells or legs and choice of their location with respect to the note are of course governed by a number of factors such as equal light transmission to series connected cells. Transformer 111 is similar to transformer 50 in FIG. 1 and its primary is connected to a 115 volt A.C. source indicated by terminals 112 and 113. The reference characters 112 and 113 are used whenever feasible in FIG. 2 to indicate corresponding terminals extending to the A.C. source.

Connected between each pair of cells such as 110 and 120 are a pair of parallel potentiometers 117 and 118, 127 and 128, 137 and 138, and 147 and 148. These potentiometers each function in a manner similar to potentiometer 60 in FIG. 1, while each one of the pair serves to provide an output indicative of a note of a respective denomination.

Thus the respective outputs of potentiometers 118, 128, 138 and 148 are connected through potentiometers 168, 178, 188, and 198 respectively, through respective rectifiers 169, 179, 189, and 199 to a common relay amplifier indicated by box 105. This group and the relay amplifier 105 serve to detect currency notes of, for example, one dollar denomination.

The potentiometers 117, 127, 137, and 147 are connected through respective potentiometers 165, 175, 185 and 195, through respective rectifiers 167, 177, 187, and 197 to the input of a relay amplifier indicated by the box 155 and this arrangement serves to detect currency notes of another denomination such as a five dollar note. In certain cases it would also be desirable to substitute a fixed resistor in the respective arms shown in this embodiment and thereby have a fixed standard or reference potential against which a note may be tested.

It will also be understood from the previous description that the cells are arranged to underlie areas of common color in a note to avoid extremes in reaction of the cells to differences in transmitted light, however, under many circumstances a cell which underlies a light area in a note of one demonination may be associated with a comparatively dark area in a note of another denomination, or vice versa.

In any event, the potentiometers 117, 118, etc., are adjusted so that the output at the arm reflects the characteristic light transmission value of the respective areas of a valid note, which is being tested. The adjustment of the potentiometers both in the arrangement shown in FIG. 1 and in FIG. 2 proceeds with a valid note in the test position and the adjustment of each potentiometer for a desired output.

It will be noted that the relay amplifiers 105 and 155 are shown in FIG. 2 without the battery such as 58 in FIG. 1, however, as the provision of the proper potentials is well known and may if desired be furnished and cut off through any one of a number of relays, such battery is believed unnecessary to the comprehension of the invention.

Also it will be noted that each relay amplifier 105 and 155 arranged to control a respective stripper relay 160 and 170 and a respective bad impulse relay 180 and 190.

Normally the stripper relay 160, for example, associated with a note of one denomination that is being tested will function to enable stripping of the note as already described, while the bad impulse relay 190 associated with the other relay amplifier relay 155 will be operated, to thereby provide a cross check on the denomination of the note. On the tray clear test, adopted to verify the collection of the note, the bad impulse relays 180 and 190 of respective relay amplifiers 105 and 155 must be operated to permit coin dispensing.

A timer motor 200 having a rotor contact 201 is also indicated in FIG. 2 and it operates in a manner similar to that for motor 100 in FIG. 1 with certain additional connections for performing its functions. In addition a reset relay 115 is indicated for performing certain resetting functions as already described and the additional functions required by the apparatus in FIG. 2.

OPERATION

In summary, as described in the aforementioned application, a currency note is deposited in a slide trough and the slide reciprocated into the test area whereupon a lock solenoid (not shown), is operated to retain the slide and note in the test position. The lock solenoid also operates the timer motor 100 to initiate the test sequence. This motor first energizes the lamps over conductor 72 to cast the required degree of light on the note.

Assuming the note is valid, each of the junctions 12, 22, 32, and the arm of potentiometer 60 in the respective parallel legs shown in FIG. 1 will exhibit approximately ground potential so that substantially no voltage change occurs at condenser 55. Thus it will be noted that if the voltage drop across variable resistor 15 is 10 volts and the drop across cell 10 is also 10 volts, while the opposite ends of the secondary 52 vary between +10 and −10 volts, the junction 12 and other output points to rectifiers 19, 29, 39, and 59 will assume a neutral condition thereby leaving condenser 55 in its initial state.

The timer motor 100 continuing its operation thereafter connects terminal 48 over conductor 73, through contacts 92 and 61, the latter on the relay amplifier 57, to the stripper relay 80 and the terminal 49.

Relay 80 locks operated through contacts 82 and contacts 86 on a reset relay 85. It initiates operation of a stripper motor and solenoid at contacts 83 in a manner described in the aforementioned application to strip the note from the slide trough into a collect box. With the note stripped and the lights still energized a substantial increase in current may extend through cells 10, 20, 30, 40, and 45. This places the junctions 12, 22, and 32 of the respective legs in an unbalanced condition so that a corresponding potential is derived at the respective arms of potentiometers 18, 28, and 38. If desired, a high resistance may be connected in series with the cells under control of the timer motor or in any other well known manner if desired to limit the current flow through the cells.

The potential derived at the junctions 12, 22, and 32 varies between positive and negative values in accordance with the A.C. derived from secondary 52, however only the positive half is transmitted through the respective rectifiers 19, 29, and 39. This charges condenser 55 and when the charge reaches a desired value, relay 55 operates to close contacts 62. This extends the operating potential from terminal 48 and rotor contact 71, conductor 73 and contact 92 to the bad impulse relay 90. It prepares a circuit for coin disposal at contacts 91. At contacts 92, it opens its operating circuit, however, at contacts 93, it locks operated over contacts 86. Thereafter, the rotor contact 71 disconnects from lead 72 to extinguish the lamps and connects to lead 74. This connects power over contacts 91 and 81 to initiate coin dispensing. Then the timer motor contact 71 disconnects from lead 74, however, the coin dispensing apparatus completes its cycle as described in the aforementioned application.

The rotor contact 71 then engages conductor 75 to operate reset relay 85 which restores all the operated components. Thus at contacts 86 it restores relays 80 and 90 and at other contacts (not shown) restores the start relay which in turn restores the lock solenoid. The motor 100 completes its cycle in a manner similar to that described in the aforementioned application. It will also be noted that relay 85 or any other suitable relay may control a circuit for condenser 55 to ensure its being in proper condition for the next test.

In the event the notes were counterfeit or invalid, the respective junctions 12, 22, and 32 and/or the arm of potentiometer 60 would be at other than the prescribed value due to the unequal voltage drops existing across respective portions of one or more parallel legs connected to secondary 52. Whether the note transmits less or more than the minimum or maximum valid light value is immaterial as the unbalance in the arm will be of at least the same magnitude. Potentiometers 18, 28, 38, and 48 are of course adjusted to allow for normal variations. Condenser 55 is therefore charged in a positive direction as explained in the tray clear test. This results in the operation of the relay amplifier 57 before rotor contact 71 engages conductor 73 to energize the stripper relay 80. Of course, the operating level of the relay amplifier 57 may be set as desired to allow for normal variations in the notes. Relay amplifier 57 closes contact 62 to prepare a circuit for relay 90 and at contacts 61 opens a possible circuit to relay 80. Now when rotor contact 71 encounters conductor 73, the bad impulse relay 90 is operated over contacts 92 and 62 instead of the stripper relay 80.

The bad impulse relay 90 closes contact 91 to prepare a circuit for coin disposal but as the stripper relay 80 is not operated, this cannot occur. At contacts 92, it opens its original circuit and thereafter the timer motor operates the reset relay 85. The apparatus is thereafter returned to normal without coin dispensing or currency collection.

Referring now to the arrangement shown in FIG. 2, the test is initiated in a similar fashion or manner as described in connection with FIG. 1. In this case, however, the note may be any one of several denominations. The timer motor 200 initiates its operation as before described in response to the operation of the lock solenoid and start relay (not shown) on positioning of the slide and currency note in the test area. The rotor contact 201 extends power from terminal 112 to light the lamps over conductor 202.

Assuming a test of a one dollar note, if valid, practically no potential will be present at the arms of respective potentiometers 118, 128, 138, and 148, while the arms of potentiometers 117, 127, 137, and 147 being adjusted for a possible different value of current will provide a potential indicative of some degree of unbalance. Since no potential is therefore transmitted through rectifiers 169, 179, 189, or 199, relay amplifier 105 will not operate its contacts, however, the positive potentials produced at the arms of potentiometers 117, 127, 137, and/or 147 is transmitted through respective rectifiers 167, 177, 187, and 197 to charge condenser 158 and operate relay amplifier 155. Relay amplifier 155 therefore opens contacts 156 and closes contacts 157. It will be understood, of course, that the desired operating level for amplifiers 105 and 155 can be set as desired and therefore potentiomeers 117, 118, 127, 128, 138, 147, or 148 need not necessarily be set for ground potential when testing respective one dollar and five dollar notes.

The timer motor 200 on proceeding through its cycle causes rotor 201 to engage lead 203 and extend power from terminal 112 over contacts 182 and 106 to energize stripper relay 160 at terminal 113. Power on lead 203 is also extended past contacts 157 to energize the five dollar bad impulse relay 220. With stripper relay 160 energized, the note is collected in a described manner and thereafter the cells 117, etc., are fully exposed to light. Under these circumstances, the potentiometers 117, 118, etc., reflect a potential other than that for which the respective arms and relay amplifiers 105 and 155 are calibrated for. As relay amplifier 155 is already operated only relay amplifier 105 will now operate, as condenser 104 is charged to the operating value of the relay amplifier. The amplifier 105 opens contacts 106, however relay 160 is already locked up over contacts 163 and 211. The potential on lead 203 is now extended over contacts 107 to energize the one dollar bad implse relay 180. With relays 160, 180, and 190 operated, a circuit for dispensing coins in accordance with a one dollar note is prepared through contacts 181, 221, 161, 171, and 191. Thereafter rotor contact 201 disconnects from the lights at lead 202 and from conductor 203 and connects to lead 204 to complete the just described circuit and initiate coin disposal, which continues as described. Then rotor contact 201 extends power to lead 205 to operate the reset relay 210.

The reset relay 210 opens contacts 211 to release relays 160, 180, and 190, which restore their respective locking contacts 163, 184, and 194. The relay 210 of course may be used to remove operating potential from relay amplifiers 105 and 155 and place condensers 104 and 158 in the proper condition. The timer motor 200 completes its cycle in a described manner whereafter the test may be repeated for another note as described.

In the event of a test of a five dollar note, the potential provided at arms of respective potentiometers 117, 127, 137, and 147 does not operate relay amplifier 155, but the potential at arms of potentiometers 118, 128, 138, and 148 operates relay amplifier 105 responsive to the validity test. Relay amplifier 105 now closes contacts 107 while opening contacts 106. Contacts 156 on relay amplifier 155 now remain closed.

Thereafter rotor 201 engages lead 203 and energizes the one dollar bad impulse relay 180 over contacts 182 and 107. It also energizes the stripper relay 170 over contacts 156 and 192. The stripper relay 170 functions in a manner similar to stripper relay 160. That is it may control the identical stripper motor and stripper solenoid to strip the note into the collect box. At contacts 171, it opens a point in the circuit to the one dollar coin dispensing circuit to prevent operation of the corresponding apparatus and at contacts 173 locks operated through contacts 211. It will be noted that on the test of a one dollar note stripper relay 160 was operated and it opened contacts 162 to prevent coin payout or dispensing for a five dollar note over a circuit to be described.

After this, the tray clear test is performed, as before, in response to the removal of the note. As a consequence, relay amplifier 155 now operates for reasons already explained and it closes contacts 157. Rotor contact 201 now extends power over lead 203 and contacts 157 to energize the five dollar bad impulse relay 190. A circuit is now prepared for coin payout commensurate with a five dollar note. This circuit is completed over contacts 193, 172, 162, 222, and 183 after rotor contact 201 leaves conductor 202 to de-energize the lamps and contacts conductor 204.

The operation then proceeds as described as the rotor contact 201 energizes relay 210 which opens the locking circuits for relays 170, 180, and 190 at contacts 211. The timer motor 200 then de-energizes relay 210 and completes its cycle.

It will be noted that in the event of an invalid one dollar or five dollar note that light transmission to any one of the cells 110, 120, 125, 130, 135, 140, 145, and 150 from the invalid note will not correspond to that necessary to maintain the corresponding potentiometer arms 117 and 118 at the necessary respective potentials. With a potential representing an invalid note present at any one of the potentiometers 118, 128, 138, or 148 and a potential representing an invalid note at any one of the potentiometers 117, 127, 137, or 147 both relay amplifiers 105 and 155 are operated. It will be noted that in the arrangement shown in FIG. 2 for testing various denomination notes that if desired each of the potentiometers such as 168, 178, 188 and 198 could instead be provided with a number of arms each extending through respective rectifiers such as 169 and 179 to a desired relay amplifier and if the potential existing at one of the arms when a note of a particular denomination was undergoing test did not correspond to a predetermined standard for that note, the note would be rejected. Thus the number of denominations that may be tested can be economically expanded without necessitating a separate potentiometer for each denomination.

The relay amplifiers therefore open respective contacts 106 and 156 to prevent operation of the respective stripper relays 160 and 170. At contacts 107 and 157, described circuits are completed to the one dollar and five dollar bad impulse relays 180 and 190 respectively as soon as rotor contact 201 engages lead 203. As neither stripper relay is operated, contacts 161 and 172 remain open to prevent completion of a circuit for either one dollar or five dollar coin dispensing or payout.

Also with relays 180 and 190 operated and relays 160 and 170 unoperated, a circuit is completed for relay 220 over contacts 195, 174, 164, and 185 to energize reject relay 220. Relay 220 in addition to providing any necessary alarms (not shown) or other auxiliary functions opens contacts 221 and 222 to additionally safeguard against circuits being completed for coin payout.

Rotor contact 201, encountering lead 204, therefore completes no circuit, but on engaging lead 205, energizes reset relay 210 as described. Relay 210 in turn releases relays 180 and 190 which open the circuit to relay 220.

While the invention has been described with reference to the testing of paper currency, it will be understood that the concepts of this invention will have application to the testing of other sheet material advanced to a position for test whereupon the sheet material is either accepted and removed or else rejected and returned or otherwise disposed of. Such other sheet material may include cellulosic or plastic strips having printing or color designations thereupon or therein such as tickets, checks, printed plastics, printed cards or other printed or colored sheet stock.

In accordance with the above, there has been shown and described herein a novel, useful, and simple arrangement for testing the response of a material or currency note with light to determine their proper disposal, and for automatically discriminating between material or notes of different character; but, it should be understood that the particular embodiment or forms of the invention described herein are not limitations upon other manners of practicing the invention.

I claim:

[1. In a material testing arrangement for determining the validity of said material, the improvement comprising means for transmitting light to said material, a plurality of light responsive cells associated with respective areas of said material, said cells arranged in parallel with each other and connected across a common source of potential, and an individual element connected in series with each cell productive of a predetermined voltage at the junction of each element and the respective cell in response to a particular amount of light transmitted from a respective area of said material to the respective cell.]

[2. In the arrangement claimed in claim 1, means for detecting the voltage at each junction to reject said material if any one of the junction voltages is some other than said predetermined value.]

3. In the arrangement claimed in claim 2 in which said detecting means is connected in common to each junction.

4. In the arrangement claimed in claim 1 in which one of said elements comprises a light responsive cell.

5. In the arrangement claimed in claim 4, a potentiometer connected between the light cell comprising said one element and the light cell connected thereto.

6. In the arrangement claimed in claim *3* [2], individually adjustable members connected between each junction and said detecting means for controlling the voltage provided to said detecting means from each junction.

7. In the arrangement claimed in claim 1 in which said material comprises a currency note having any one of a plurality of different denominations, and an individual potentiometer for each denomination connected between each element and its respective cell whereby a voltage characteristic of each denomination is provided at each potentiometer responsive to the presence of a note of the respective denomination in association with said cells.

[8. A currency testing arrangement for determining the validity of a currency note comprising a plurality of light responsive cells whose impedance varies in accordance with the light transmitted thereto and associated with respective areas of said note for receiving respective amounts of light transmission therefrom, said cells connected in parallel across a common source of potential, and a plurality of electrical impedance elements each individually corresponding to a different cell and each connected in series with its individual cell across said source, said impedance elements each individually adjustable to produce a predetermined potential at the junction thereof to each cell and in response to predetermined quantity of light transmission from said note.]

9. The arrangement claimed in claim 8 in which one of said impedance elements comprises another light responsive cell associated with a respective area of said note.

10. The arrangement claimed in claim 9 in which an additional adjustable impedance element is connected between said other cell and the respective series cell, said additional adjustable element arranged to provide said predetermined potential at one point thereon.

[11. A currency testing arrangement for determining the validity of a currency note comprising a plurality of light responsive cells associated with respective areas of said note and arranged to respond to light transmitted from respective areas of said note, said cells arranged in parallel and connected across a common source of potential, and an individual electrical impedance element for each cell connected in series with its respective cell across said source and productive of one potential at the junction of each cell and its respective element in response to light transmission from said note to said cells corresponding to a valid note and another potential at one junction in response to light transmission from said note to said cells corresponding to an invalid note.]

12. A currency testing arrangement for determining the validity of a currency note comprising a plurality of light responsive cells whose impedance varies in accordance with varying amounts of light transmitted thereto and associated with respective areas of said note for receiving respective amounts of light transmission therefrom, certain of said cells arranged in parallel, other respective ones of said cells connected in series with respective ones of certain cells, and a source of potential connected across all of said cells.

13. The arrangement claimed in claim 12 in which an adjustable impedance element is connected between each certain and respective other cell to produce one potential at the junction thereof in response to light transmission from said note to said cells corresponding to a valid note and another potential at the junction in response to light transmission from said note to said cells corresponding to an invalid note.

14. The arrangement claimed in claim 12 in which a plurality of adjustable impedance elements each corresponding to a note of different denomination are connected between a respective certain and other cell for deriving a potential at the junction of said respective certain and said other cell individually characteristic of each denomination on association with said cells.

15. A currency test arrangement for automatically determining the validity of currency notes of different denominations comprising means for transmitting light from each note to a plurality of light responsive cells associated with respective areas of each note, certain of said cells connected in parallel with each other and in series with respective other one of said cells across a single source of potential, and means individual to each denomination connected between each certain cell and its other cell for deriving a potential characteristic of each note of its individual denomination if valid and for deriving another potential characteristic of a note of another denomination.

16. The arrangement claimed in claim 15, in which an evaluating circuit for each denomination connected to the respective means for automatically permitting coin payout commensurate with a denomination of each note only if said characteristic potentials are derived.

*17. Material testing apparatus including in combination a source of potential, a first and a second impedance each comprising a photoconductive device, a third and a fourth impedance, means connecting the first and third impedances in series to form a first circuit, means connecting the second and fourth impedances in series to form a second circuit, means connecting the source to each of the two circuits, a passive OR circuit having two inputs and providing an output, passive means coupling the junction of the first circuit impedances to a first OR circuit input, passive means coupling the junction of the second circuit impedances to the second OR circuit input, an active power-amplifying device having an input, and means connecting the OR circuit output to the input of the active device.*

*18. Apparatus as in claim 17 in which the OR circuit comprises two rectifiers each having an anode terminal and a cathode terminal and means connecting one terminal of one rectifier to the corresponding terminal of the other rectifier.*

*19. Apparatus as in claim 17 in which the third impedance comprises a photoconductive device.*

*20. Apparatus as in claim 17 which further includes means for varying one of the impedances of each of the circuits.*

*21. Apparatus as in claim 17 which further includes means for inversely varying the first and third impedances such that their sum is constant.*

*22. Apparatus as in claim 17 in which one of the passive coupling means comprises a voltage divider.*

*23. Apparatus as in claim 17 in which the active device comprises a relay.*

*24. Apparatus as in claim 17 in which the active device comprises a trigger circuit.*

*25. Apparatus as in claim 17 which further includes means for varying the sensitivity of the active device.*

*26. Apparatus as in claim 17 in which the source provides an alternating current potential.*

*27. Apparatus as in claim 17 which further includes a capacitor and means connecting the capacitor to the OR circuit output.*

*28. Material testing apparatus including in combination a source of potential, a first and a second and a third impedance each comprising a photoconductive device, a fourth and a fifth and a sixth impedance, means connecting the first and fourth impedances in series to form a first circuit, means connecting the second and fifth impedances in series to form a second circuit, means connecting the third and sixth impedances in series to form a third circuit, means connecting the source to each of the three circuits, a passive OR circuit having three inputs and providing an output, passive means coupling the junction of the first circuit impedances to a first OR circuit input, passive means coupling the junction of the second circuit impedances to a second OR circuit input, passive means coupling the junction of the third circuit impedances to the third OR circuit input, an active power-amplifying device having an input, and means connecting the OR circuit output to the input of the active device.*

*29. Apparatus as in claim 28 which further includes means for varying one of the impedances of each of the circuits and in which the OR circuit comprises three rectifiers each having an anode terminal and a cathode terminal and means connecting one terminal of one rectifier to the corresponding terminal of each of the other rectifiers.*

*30. Apparatus as in claim 28 which further includes means for inversely varying the first and fourth impedances such that their sum is constant and in which the fourth impedance comprises a photoconductive device.*

*31. Apparatus as in claim 28 which further includes means for varying the sensitivity of the active device and in which the active device comprises a trigger circuit and a relay.*

*32. Apparatus as in claim 28 which further includes a capacitor and means connecting the capacitor to the OR circuit output and in which the source provides an alternating current potential.*

References Cited by the Examiner

The following references, cited by the Examiner, are of record in the patented file of this patent or the original patent.

UNITED STATES PATENTS

| | | |
|---|---|---|
| 1,834,905 | 12/1931 | Sheldon. |
| 1,922,188 | 8/1933 | Zworykin. |
| 2,244,826 | 6/1941 | Cox. |
| 2,393,631 | 1/1946 | Harrison et al. |
| 2,470,877 | 5/1949 | Stuland. |

(Other references on following page)

UNITED STATES PATENTS

| | | | |
|---|---|---|---|
| 2,599,975 | 6/1952 | Carpenter. | |
| 2,803,754 | 8/1957 | Cox. | |
| 2,842,672 | 7/1958 | Thomsen | 250—210 X |
| 2,844,068 | 7/1958 | Williams. | |
| 2,898,801 | 8/1958 | Rockafellow | 88—14 |
| 2,922,893 | 1/1960 | Ett. | |
| 2,941,187 | 6/1960 | Simjian. | |

| | | | |
|---|---|---|---|
| 2,951,164 | 8/1960 | Timms. | |
| 3,142,383 | 7/1964 | Boyer | 209—111.7 X |

FOREIGN PATENTS

| | | |
|---|---|---|
| 879,323 | 6/1953 | Germany. |

ROBERT B. REEVES, *Primary Examiner.*

STANLEY H. TOLLBERG, *Examiner.*